Patented June 13, 1950

2,511,056

UNITED STATES PATENT OFFICE 2,511,056

ORGANO SILOXANES AND THEIR PRODUCTION

John T. Goodwin, Jr., Pittsburgh, Pa., assignor to Dow Corning Corporation, Midland, Mich., a corporation of Michigan No Drawing. Application April 20, 1948, Serial No. 22,256. In Great Britain July 1, 1947

5 Claims. (Cl. 260—448.2)

1

The present invention relates to the production of polymeric fluids which have the fundamental repeating structure —$CH_2SiR_2$— and to the fluids so produced.

In the history of the organosilicon compounds, two principal types of compounds containing more than one silicon atom have heretofore been described. In one of these types, the silicon atoms are linked directly to each other. These are the so-called polysilanes, heretofore described by Kipping. The present organosilicon industry is based upon the siloxanes, which are materials in which the silicon atoms are linked through oxygen atoms. There has been some mention in the literature heretofore of organosilicon halides containing a plurality of silicon atoms in which the silicon atoms are linked by large divalent organic radicals and the remaining valences of the silicon atoms are satisfied by chlorine.

Objects of the present invention are to produce organosilicon compounds in which the silicon atoms are linked through methylene bridges.

In accordance with the present invention a compound of the type $R_3Si(CH_2SiR_2)_mY$ is hydrolyzed and the hydrolyzate is condensed whereby compounds of the type $R_3Si(CH_2SiR_2)_m$—O—$(R_2SiCH_2)_mSiR_3$ are produced, in which R represents monocyclicaryl or alkyl and each $m$ represents a positive integer. The compounds so produced are novel in the art and are fluids of which the lower molecular weight species are high boiling and the high molecular weight species are nonvolatile.

The compounds of the type indicated which are hydrolyzed in accordance with the present invention may be prepared by interacting a compound of the type $R_3SiX$ with a compound of the type $XCH_2SiR_2Y$ in which X represents a halogen, preferably chlorine or bromine, R represents monovalent hydrocarbon radicals such as phenyl and alkyl including alkyl radicals from methyl to higher alkyls such as octadecyl and Y represents alkoxy or halogen such as ethoxy, chlorine and bromine. The two compounds are reacted by contacting the compound containing the radical $XCH_2$— with an alkali metal in the presence of the other compound. In this reaction a mixture of compounds is obtained of the type which is hydrolyzed in accordance herewith, which products contain molecular species having one methylene link between two silicon atoms and also molecular species containing more than one methylene link between various pairs of silicon atoms. No polymethylene linkage between any pair of silicon atoms has been found in this product.

If it is desired to increase the chain length of the reaction product, so produced, this product can be reacted with a further amount of the compound containing the grouping $XCH_2$ by the same method in which the two are interacted with an alkali metal. The intermediates produced by the two methods outlined may, if desired, be separated by distillation in the cases of those intermediates which are sufficiently low boiling. The reaction product should be separated from the salt produce in the reaction though this separation does not need to be conducted as a separate step.

The entire reaction product including the salt can be mixed with water to effect hydrolysis of the reaction product and simultaneous removal of the salt. No special means need be taken in order to obtain condensation of the silanol. The silanol may be recovered as such by distillation. However, it condenses readily upon standing at room temperature. Condensation is catalyzed by any of the conventional condensation catalysts, such as are present when the pH is either above or below 7.

The compounds produced by the hydrolysis and condensation are of a wide range of utility. Those compounds which boil at around 200° C. at one mm. are of utility as diffusion pump fluids, particularly inasmuch as it is possible to obtain a very good purification of the intermediates which are subjected to the process hereof, so that the product boiling in the range stated is a single species. The fluids hereof are in general of considerable utility as lubricants. The products in which R represents methyl are lubricants which have utility at extremely low temperature being fluid at temperatures down to —115° C. which is substantially lower than the freezing point of dimethylpolysiloxane. The lubricating characteristics of the fluids may be improved by the substitution of monocyclicaryl radicals such as phenyl or tolyl radicals for some of the methyl radicals. The products hereof are likewise of substantial value in preventing foaming of hydrocarbons, such as petroleum lubricating oils and in systems involving mixtures of organic materials and water where foaming is encountered, such as in the production of yeast.

Example 1

A mixture of 217 parts by weight of $(CH_3)_3SiCl$ 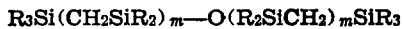 and 305 parts of $ClCH_2Si(CH_3)_2OC_2H_5$ was added to a dispersion of 92 parts of sodium in 800 parts of toluene at a temperature of 110° C. under reflux. The addition was made at a rate sufficiently low that the heat of reaction was removed by the coolant in the reflux condenser. The reaction mixture was cooled and filtered. Upon distillation 298 parts of a material was obtained which was identified as (CH₃)₃SiCH₂Si(CH₃)₂OC₂H₅

This boiled at 161° C. at 740 mm. This is a yield of 78.5%. The residue from this run was combined with the residues of other similar runs and upon distillation there was obtained a yield of material identified as (CH₃)₃SiCH₂Si(CH₃)₂CH₂Si(CH₃)₂OC₂H₅

This material boils at 226° C. at 740 mm. This distillation was made at 50 mm. At this pressure the second member of the series boils at 135° C. The distillation was continued and the boiling range and refractive index showed that the third member of the series was contained in the distillate. The residue appeared to contain higher members of the series. By substituting ClCH₂Si(CH₃)₂Cl for the equivalent ester the yield of the first member of the series would be reduced and the yields of the higher members increased. In this instance of course, the products obtained are chlorides instead of esters. The two products were separately hydrolyzed in water and condensed by allowing them to stand at room temperature whereby the following materials were obtained:

(1) [(CH₃)₃SiCH₂Si(CH₃)₂]₂O
(2) {(CH₃)₃Si[CH₂Si(CH₃)₂]₂}₂O

*Example 2*

The two ethoxy silanes obtained in Example 1 were converted to the equivalent chlorides by reacting the ethoxy compounds with acetyl chloride. The chlorides so produced were hydrolyzed and the hydrolyzates were condensed. The two materials of Formulae 1 and 2 were produced by this method.

*Example 3*

The ethoxy compound of Example 1 which contained two methylene links between silicon atoms was converted to the equivalent chloride having the formula (CH₃)₃SiCH₂Si(CH₃)₂CH₂Si(CH₃)₂Cl by reaction with acetyl chloride. 152.5 parts by weight of ClCH₂Si(CH₃)₂OC₂H₅ was added to 170 parts of the above chloride in 160 parts of toluene containing 46 parts of sodium dispersed therein. The temperature was raised to 110° C. prior to the addition to melt and effect dispersion of the sodium. The addition was made at a rate to allow total reflux with the amount of cooling available. The reaction mixture was cooled and filtered. The filtrate was distilled. There was thereby obtained a yield of 162.2 parts of a product identified as (CH₃)₃Si[CH₂Si(CH₃)₂]₃OC₂H₅ which boiled at 260° C. at 740 mm. This product was hydrolyzed with water and condensed at room temperature by allowing the hydrolyzate to stand. A product was obtained of the following structure:

(3)   {(CH₃)₃Si[CH₂Si(CH₃)₂]ₓ}₂O where x equals 3.

Compounds (1), (2) and (3) have the following properties:

| Compound | B. P., °C. | F. P., °C. | (n) | D²⁵ |
|---|---|---|---|---|
| (1) | 126 at 20 mm | −115 | 1.4319 | 0.8311 |
| (2) | 200 at 19 mm | −115 | 1.4528 | 0.8580 |
| (3) | 280 at 26 mm | −115 | 1.4645 | 0.8705 |

*Example 4*

The ethoxy silane produced in Example 3 was converted to the equivalent chloride by reacting the ethoxy silane with acetyl chloride whereby chlorine was substituted for ethoxyl. The chloride so produced was hydrolyzed and condensed whereby the product of Formula 3 was obtained.

*Example 5*

By the methods outlined the homologues were produced which contained four and five methylene links per molecule together with one ethoxyl radical. Also a non-volatile material residue was obtained in the synthesis of the ethoxy compounds in Examples 1 and 3 which residue contained compounds which averaged approximately seven to eight methylene links per molecule. Each of these materials including the residue was hydrolyzed with water and condensed by allowing the hydrolyzate to stand whereby a series of oils was obtained. The following compounds were obtained:

(4) {(CH₃)₃Si[CH₂Si(CH₃)₂]₄}₂O
(5) {(CH₃)₃Si[CH₂Si(CH₃)₂]₅}₂O
(6) An oil from the residue.

*Example 6*

46 parts of sodium and 310 parts of toluene were heated in a reaction vessel to 110° C. to melt the sodium. A mixture of 170.5 parts of chloro(dimethyl)phenylsilane and 152.5 parts of chloromethylethoxydimethylsilane were added to the toluene sodium mixture at a rate such that the temperature was maintained at 100 to 110° C. with the cooling available. After addition of all of this mixture, the reaction mixture was maintained at 110° C. for 1.5 hours. The reaction product was filtered to separate the salt and the toluene was stripped from the product. The residue was distilled under vacuum. A forecut of chlorodimethylphenylsilane was obtained. The compound C₆H₅(CH₃)₂SiCH₂Si(CH₃)₂OC₂H₅ was obtained in 43.5 percent of theoretical yield. This compound boils at 144° C. at 23.5 mm. and has an index of refraction at 25° at 1.4839 and density of 0.9152. Analytical data established that the product was the compound indicated. 44 grams of this compound were mixed with 100 ml. of water containing 10 percent sulfuric acid by volume. The mixture was refluxed for 24 hours. The oily layer was separated, washed, and diluted with benzene in order to remove the water upon distillation. The silanol formed by hydrolysis condensed during the course of hydrolysis and was distilled to remove benzene and water. This disiloxane which has the formula

[C₆H₅(CH₃)₂SiCH₂Si(CH₃)₂]₂O was found to boil at 197.8° C. at 1.8 mm. It had an index of refraction of 1.5107 and a density of 0.9548 at 25° C. Analysis shows it to be the indicated compound. This compound is of a boiling point suitable for use as a diffusion pump fluid.

Example 7

95 parts of the compound $(CH_3)_3SiCH_2Si(CH_3)_2OC_2H_5$ was reacted with 116 parts of normal butyl acetate in the presence of two parts of silicon tetrachloride as a catalyst. The mixture was refluxed with the temperature being controlled to allow the escape of ethyl acetate. The product was then distilled and was found by analysis to be 2-butoxy-2,4,4-trimethyl-2,4-disilapentane, the butoxy analogue of the starting material. This compound boils at 198.5° C. at 740 mm., has a density at 25° C. of 0.812 and an index of refraction of 1.4211. This compound is hydrolyzable and the hydrolyzate is condensable to yield the compound of Formula 1 above.

Example 8

A mixture of 85 parts of $(CH_3)_2C_6H_5SiCl$ and 107 parts of $ClCH_2SiC_6H_5CH_3OC_2H_5$ was dropped into 23 parts of molten sodium and 240 parts of toluene at such a rate that the reaction temperature was maintained at 100–110° C. After all the reactants had been added, the mixture was maintained at 100–110° C. for one hour. The products were then cooled, filtered, the salts were washed with toluene, the washings were added to the filtrate and the combined liquids were stripped of toluene. The residue from the stripping operation was fractionally distilled and yielded 82 parts of $(CH_3)_2C_6H_5SiCH_2SiCH_3C_6H_5OC_2H_5$. This material has the properties, $(n)_D^{25}$ 1.5314, density at 25° C. of 0.984, and boiling point 207° C. at 24 mm. The residue contained higher members of the same series of compounds. The compound so prepared was hydrolyzed by refluxing it with one-fifth of its weight of sulfuric acid for 16 hours. An oily material of the composition $[(CH_3)_2C_6H_5SiCH_2SiCH_3C_6H_5]_2O$ was obtained which was non-distillable at 200° C. at 3 mm. absolute pressure. This product is an excellent lubricant.

Example 9

A mixture of 59 parts of $(CH_3)_2C_6H_5SiCl$ and 62 parts of $ClCH_2SiCH_3C_4H_9OC_2H_5$ was dropped into a flask containing 15 parts of sodium and 200 parts of toluene which had been heated until the sodium was melted. The halides were added at such a rate that the reaction temperature was maintained at 100–110° C. After all the reactants had been added, the materials were maintained at 100–110° C. for one hour. The products were then cooled, filtered, the salts were washed with toluene, the washings were added to the filtrate and the combined liquids were stripped of toluene. The residue from the stripping operation was fractionally distilled and yielded 55 parts of the compound $(CH_3)_2C_6H_5SiCH_2SiCH_3C_4H_9OC_2H_5$ This material had the properties, $(n)_D^{25}$ 1.4948, density of 25° 0.9177, boiling point 184° C. at 25 mm. The compound so prepared was hydrolyzed by refluxing it with one-fifth of its weight of sulfuric acid for 16 hours. An oily material of the composition $[(CH_3)_2C_6H_5SiCH_2SiCH_3C_4H_9]_2O$ was obtained which was non-distillable at 200° C. at 3 mm. absolute pressure. This product is an excellent lubricant.

That which is claimed is:

1. Compositions of the general formula $R_3Si[CH_2SiR_2]_mO[CH_2SiR_2]_mSiR_3$ in which each R is a radical of the group consisting of monocyclicaryl and alkyl radicals and each $m$ has a value of from 1 to 8.

2. $[C_6H_5(CH_3)_2SiCH_2Si(CH_3)_2]_2O$.
3. $[C_6H_5(CH_3)_2SiCH_2SiC_6H_5CH_3]_2O$.
4. Compositions of the general formula $R_3Si(CH_2SiR_2)_mO(CH_2SiR_2)_mSiR_3$ in which some R's represent alkyl radicals and the remainder of the R's represent monocyclic aryl radicals, and in which each $m$ has a value of from 1 to 8.

5. Compositions of the general formula $(CH_3)_3Si[CH_2Si(CH_3)_2]_mO$
$[CH_2Si(CH_3)_2]Si(CH_3)_3$ in which each $m$ has a value of from 1 to 8.

JOHN T. GOODWIN, Jr.

REFERENCES CITED

The following references are of record in the file of this patent:

UNITED STATES PATENTS

| Number | Name | Date |
|---|---|---|
| 2,352,974 | Rochow | July 4, 1944 |

OTHER REFERENCES

Goodwin et al.: "Jour. Amer. Chem. Soc.," vol. 69 (Sept. 1947), page 2247.

Rochow: "Introduction to the Chemistry of the Silicones" (1946), pages 46–49, Wiley & Sons publishers.